US009497602B2

(12) United States Patent
Chiu

(10) Patent No.: US 9,497,602 B2
(45) Date of Patent: *Nov. 15, 2016

(54) SYSTEM AND METHOD OF ENTERPRISE MOBILE MESSAGE

(71) Applicant: MITAKE INFORMATION CORPORATION, Taipei (TW)

(72) Inventor: Hung-Che Chiu, Taipei (TW)

(73) Assignee: MITAKE INFORMATION CORPORATION, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,431

(22) Filed: Jun. 10, 2015

(65) Prior Publication Data

US 2016/0227387 A1 Aug. 4, 2016

(30) Foreign Application Priority Data

Jan. 30, 2015 (TW) .............................. 104103179 A

(51) Int. Cl.
| | | |
|---|---|---|
| *H04W 4/12* | (2009.01) | |
| *H04L 29/08* | (2006.01) | |
| *H04L 29/06* | (2006.01) | |
| *H04W 12/06* | (2009.01) | |
| *H04L 12/58* | (2006.01) | |

(52) U.S. Cl.
CPC .............. *H04W 4/12* (2013.01); *H04L 63/083* (2013.01); *H04L 67/06* (2013.01); *H04L 67/10* (2013.01); *H04L 51/00* (2013.01); *H04W 12/06* (2013.01)

(58) Field of Classification Search
CPC ..... H04L 41/12; H04L 51/24; H04L 63/083; H04L 67/26; H04W 4/12; H04W 76/02; H04W 12/06; H04W 88/184
See application file for complete search history.

(56) References Cited

U.S. PATENT DOCUMENTS

| | | | | |
|---|---|---|---|---|
| 8,296,380 | B1 * | 10/2012 | Kelly ................ | G06F 17/30528 703/23 |
| 8,769,031 | B1 * | 7/2014 | Lee ........................ | G06Q 50/01 709/206 |
| 2008/0049919 | A1 * | 2/2008 | Pounds .............. | G06Q 30/0251 379/201.04 |
| 2010/0313250 | A1 * | 12/2010 | Chow ................ | G06F 17/30899 726/5 |
| 2011/0161444 | A1 * | 6/2011 | Chauhan ............. | G06F 17/3089 709/206 |

FOREIGN PATENT DOCUMENTS

CA    WO 2015188246 A1 * 12/2015 ............. G06F 21/62

* cited by examiner

*Primary Examiner* — Nizar Sivji
(74) *Attorney, Agent, or Firm* — Bacon & Thomas, PLLC

(57) ABSTRACT

A system and method of an enterprise mobile message are provided. The system includes a database, a server, a push gateway, and a mobile communication device. A cloud is composed of the database, the server and the push gateway. The server delivers a message content in the form of a push notification through the push gateway and an external push host to the mobile communication device corresponding to a member. The server creates an unread list according to a reading record uploaded from the mobile communication device of the member. The server resends the push notification to the members selected from the unread list.

51 Claims, 8 Drawing Sheets

SYSTEM AND METHOD OF ENTERPRISE MOBILE MESSAGE

BACKGROUND OF THE INVENTION

Field of the Invention

The present invention relates to cloud technology applicable to mobile communication devices, and more particularly, to a system and method of an enterprise mobile message.

Description of the Prior Art

Nowadays there are many message exchanging systems on mobile communication devices using cloud technology for societies and organizations, but conventional mobile message delivery technology still has too many drawbacks to meet the needs for corporate governance.

Taiwan's Published Patent Application 201312971 (hereinafter referred to as "citation 1"), entitled Method of Receiving Message, discloses a method of receiving messages. The method is applicable to electronic devices. The method comprises the steps of: receiving a message; getting connected to a server according to the IP built in an electronic device upon the receipt of the message; retrieving a multimedia file from the server; and downloading and playing the multimedia file. The technical problem to be solved by citation 1 is as follows: the frame for displaying a short message is primitive, because the frame merely displays the contents of the short message and provides simple operation functions, such as editing short messages. Users who often keep in touch with each other by short messages not only attach great importance to prompts but also regard a robust short message interface important" (see citation 1, the specification, paragraph [0002]). The technical effect produced by citation 1 is "downloading multimedia files through messages".

Taiwan Patent 573268, entitled Channel Subscription, Push System, and Method Thereof (hereinafter referred to as "citation 2"), discloses channel subscription, a push system, and a method thereof, wherein a user connects a mobile communication device to a WML server so as to subscribe to a channel. The WML server produces a subscription list and assigns code SS DTD to the subscription list. An SQL server not only receives and stores SSDTD but also determines whether information pertaining to the channel has been updated in accordance with SS DTD. If the determination is affirmative, the SQL server sends an update message to a push server, such that the push server receives the update message and pushes the update message to the mobile communication device. The mobile communication device receives the update message, and then the user connects the mobile communication device to the WML server in accordance with the update message, so as to download the latest information. The technical problems to be solved by citation 2 are as follows: "1. the user must take the initiative in making an inquiry to check whether the previously subscribed information has been updated, and in consequence the user cannot be informed of the latest message in a real-time manner; 2. the information received by the user is seldom categorized, organized, or managed, and in consequence it is not reader-friendly; and 3. In general, although the subscribed information is received by the mobile communication device, it cannot be categorized, organized, or managed, thereby precluding the user from subscribing to multiple messages" (see citation 2, the specification, Background of the Invention, last paragraph). The technical effect produced by citation 2 is as follows: as soon as information of a channel is updated, a user is informed of the update by push technology so that the user can learn about the latest information instantly; and the channel-related information received by the user is categorized, organized, and managed, such that the user can read it easily".

Taiwan Patent I359600 (hereinafter referred to as "citation 3"), entitled Method and System of Subscribing to Mobile Channel Having Delivered Content, discloses a method and system of creating a delivered content for channel subscription in a mobile network, comprising the steps of: creating a subscription from a content provider and a mobile apparatus in the mobile network; and delivering a delivered content to a delivery server. The technical problem to be solved by citation 3 is as follows: " . . . the other alternatives include push and broadcast or community broadcast which complies with SMS; in case of broadcast, it is impossible to standardize delivery in order to meet the requirement of the capability of a specific apparatus or a specific user; therefore the systems do not have intelligence associated with them" (see citation 3, the specification, paragraph [0005]). The technical effect produced by citation 3 is as follows: provide a subscription model and topology, wherein both subscribed information and a delivered content are sent to a delivery server or a content provider.

Citation 4 is directed to providing message exchange service in a person-to-person manner or within an organization by a cloud, a mobile communication device, and push technology, as well as, for example, "Line" application and a back-end system thereof developed by Japan-based LINE Corporation, a subsidiary of South Korea-based NHN, and Facebook's "WhatsApp" application and a back-end system thereof. The technical problem to be solved by citation 4 is as follows: message contents sent through conventional short messages are not diverse enough to bridge the gap of communication vividly and flexibly. The technical effect produced by citation 4 is as follows: providing message exchange (chat room) service in a person-to-person manner or within an organization and rendering message pictures more vivid and flexible.

According to the aforesaid citations, none of the servers of the cloud is equipped with a reading record management module for coping with "the low efficiency in delivering important messages within a company" and "the difficulty in following up the reading state of a sent message". For example, in the situation where a specific department supervisor sends an important message to all the members within the department, the supervisor finds it difficult to create an accurate complete member list of all unread messages quickly because the prior art does not disclose any reading record management module for creating an "unread list". The aforesaid problems are severe especially when the receivers are numerous. Although citation 4 (Line and WhatsApp) discloses checking whether a "message has been read", it only permits checking whether the other user in an one-to-one chat room has read the message, and in consequence the message cannot be checked in a chat room which houses multiple users. Furthermore, none of citations 1, 2, 3, and 4 discloses a push notification resending technique for resending a push notification related to a message to unread members.

The aforesaid problems, which citations 1, 2, 3, and 4 are confronted with, occur not only because cloud-based servers are not sufficiently capable of processing message data stream which originates from members' mobile communication devices, but also because cloud-based hardware resources lack correlation records, and in consequence a cloud dedicated to a company is not efficient in sending a message, confirming a read state, and resending the message during a process of delivering important messages. Moreover, even if an important message is sent anew repeatedly, members are likely to miss the important message whenever the mobile communication devices of the members still inform the members of the important message by a conventional prompt. In view of this, it is necessary to provide a cloud system and method of an enterprise mobile message and a mobile communication device for use in accessing the cloud so as to create an unread list in accordance with members' reading records, enable a message receiver to select members from the unread list, and allow a push notification to be sent again, so that hardware resources available to the mobile communication devices are accessed in a manner different from what a conventional prompt can achieve as soon as the push notification is sent again, thereby enhancing the efficiency of delivering important messages and overcoming the drawbacks of the prior art.

SUMMARY OF THE INVENTION

In view of the aforesaid drawbacks of the prior art, the present invention provides a system and method of an enterprise mobile message to create an unread list in accordance with members' reading records and resend a push notification to members selected from the unread list.

The present invention provides a system of an enterprise mobile message. The system comprises a database, a server and a push gateway at a server end, and a mobile communication device at a client end. The database, the server, and the push gateway together form a cloud. The database stores therein at least one message, a plurality of member information sets, and at least one read/unread information set. Each message comprises a message content and a recipient list. The member information sets each comprises an account and a password. The read/unread information set records a read/unread state of the message associated with the member information sets. The server accesses the database, comprises a first network communication module, and establishes a network connection with a mobile communication device associated with one of the member information sets. The system further comprises a login verification module for verifying whether the mobile communication device is connected to the server through a network. Preferably, the uploaded account and the uploaded password are received through a network connection to undergo verification. The system further comprises a first message module for receiving an uploaded message, writing the uploaded message to the database, and creating a recipient push list in accordance with the recipient list of the message, wherein the recipient push list comprises a push ID associated with the mobile communication device. The system further comprises a reading record management module for creating a read list or an unread list in accordance with the member information sets associated with the read/unread information set, and, preferably, recording it in the read/unread information set in accordance with a read state uploaded, creating the read list in accordance with the read/unread information set, and comparing the member information sets in accordance with the read/unread information set to thereby create the unread list. The system further comprises a resending notification module for creating a resending list in accordance with the read/unread information set. The resending list comprises the push ID of the member information sets associated with the unread message. Preferably, the resending list is created in accordance with a member selection instruction of the unread list. The push gateway creates a push notification in accordance with the message and sends the push notification to the mobile communication device corresponding to the recipient push list (for use with a first-instance push, i.e., original push) or the resending list (for use with a second-instance push, i.e., a push sent against) through an external push host. The push notification comprises a push notification serial number. The push notification serial number enables the mobile communication device to download the message content from the server.

The mobile communication device has a screen and executes an application. The application comprises: a second network communication module for establishing a network connection with the first network communication module of the server; a login module for receiving the account and the password, wherein the second network communication module uploads the account and the password to the server; a data access module for triggering the second network communication module to establish a network connection with the first network communication module of the server after receiving the push notification and then downloading from the server the message content corresponding to the push notification serial number; and a second message module for displaying the message on the screen, receiving a reading instruction of a message, uploading the read state, receiving a read list query instruction of a message to download and display the read list, receiving an unread list query instruction of a message to download and display the unread list, receiving a member selection instruction of the unread list, and uploading the member selection instruction of the unread list to the server. Furthermore, the application further comprises a message entering module for entering the message and the recipient list and uploading them to the server through the second network communication module.

The mobile communication device preferably comprises one or more processors. The one or more processors execute a plurality of program instructions. The program instructions comprise: a first program instruction for instructing the mobile communication device to establish a network connection with the server to undergo login verification; a second program instruction for instructing the mobile communication device to download from the server the message content corresponding to a push notification serial number after receiving the push notification; a third program instruction for instructing the mobile communication device to display the message content on a screen and download and display the unread list in response to an unread list query instruction, instructing the mobile communication device to respond to a reading instruction of the message and upload the read state, and instructing the mobile communication device to download and display the read list in response to a read list query instruction of the message; and a fourth program instruction for instructing the mobile communication device to receive the message entered and upload the message to the server, wherein the message comprises the message content and the recipient list.

The present invention provides a method of an enterprise mobile message, applicable to a cloud comprising a database, a server, and a push gateway. The method comprises the steps of: storing a plurality of member information sets in the database, wherein the member information sets each comprises an account and a password; establishing a network connection between the server and a mobile communication device associated with one of the member information sets, wherein the server receives the account and the password uploaded by the mobile communication device to undergo verification, downloads a message content to the mobile communication device at the request of the mobile communication device, receives a read state associated with the message content and derived from the mobile communication device, and records the read state in the read/unread information set; receiving an uploaded message and writing it to the database by the server, wherein the message comprises a message content and a recipient list; performing a data mapping process by the server in accordance with the recipient list and the database and creating a recipient push list by the server, wherein the recipient push list comprises a push ID corresponding to the member information sets; creating a first push notification by the push gateway in accordance with the message, wherein the first push notification comprises a push notification serial number, and a push host sends the first push notification to the mobile communication device of the push ID corresponding to the recipient push list; receiving by the server the push notification serial number uploaded and inquired about by the mobile communication device, and providing by the server a message content corresponding to the push notification serial number, such that the mobile communication device can download the message content; receiving by the server an uploaded unread list query instruction, comparing the member information sets in accordance with the read/unread information set to create an unread list, and sending the unread list to the mobile communication device; creating a resending list by the server in accordance with the read/unread information set, wherein, preferably, the server receives a member selection instruction of the uploaded unread list to create a resending list, and the resending list comprises the push ID of member information sets associated with the unread message content; and creating a second push notification by the push gateway in accordance with the message, wherein the second push notification comprises the push notification serial number, and the push host sends the second push notification to the mobile communication device corresponding to the push ID of the resending list.

The present invention provides a method of an enterprise mobile message. The method is for a mobile communication device to access a cloud. The cloud comprises a database, a server, and a push gateway. The database stores therein a plurality of messages and a plurality of member information sets. The member information sets each comprises an account and a password. The mobile communication device has a screen and executes an application to implement the method. The method comprises the steps of: establishing a network connection between the mobile communication device and the server, receiving an entered account and a password, and uploading the account and the password to the server to undergo login verification; downloading a message from the server and displaying the message on the screen; receiving a reading instruction of the message and uploading a read state to the server; receiving an unread list query instruction of the message to download an unread list and display the unread list on the screen; and receiving a member selection instruction of the unread list and uploading the member selection instruction to the server.

The present invention provides a method of an enterprise mobile message. The method is for a mobile communication device to access a cloud. The cloud comprises a database, a server, and a push gateway. The database stores therein at least one message content, a plurality of member information sets, and an unread list. The unread list records the member information sets pertaining to unread message content. The mobile communication device comprises one or more processors. The one or more processors execute a plurality of program instructions. The program instructions comprise: a first program instruction for instructing the mobile communication device to establish a network connection with the server so as to undergo login verification; a second program instruction for instructing the mobile communication device to download from the server the message content and the unread list; a third program instruction for instructing the mobile communication device to display the member information sets associated with the unread list in accordance with the unread list; and a fourth program instruction for instructing the mobile communication device to receive a member selection instruction associated with the unread list and upload the member selection instruction to the server, so as to allow the server to create a resending list, allow the push gateway to create a push notification, and allow an external push host to send the push notification to the mobile communication device corresponding to the resending list.

The embodiments below describe the features and advantages of the present invention in detail, and its contents is sufficient to allow any person skilled in the art to understand the technical contents of the present invention and implement it accordingly. The disclosure of the specification, claims, and drawings enable any person skilled in the art to understand the objectives and advantages of the present invention easily.

DETAILED DESCRIPTION OF THE EMBODIMENTS

In an embodiment of the present invention, enterprise mobile messages, such as important corporate notices, are for use with a bulletin board message of a mobile bulletin board and convey from top to bottom (i.e., from a managing director to the staff of the organization). In an embodiment of the present invention, enterprise mobile messages are for use with a chat message of a mobile chat room, especially a multi-user chat room rather than an one-to-one chat room, when, for example, all the members of a department attend a multi-user online conference with a chat room and send the chat messages to each other. In an embodiment of the present invention, enterprise mobile messages are for use with articles of mobile timeline news (also known as news feed) when, for example, a department member sends an article to his or her department colleague.

Figure 1:
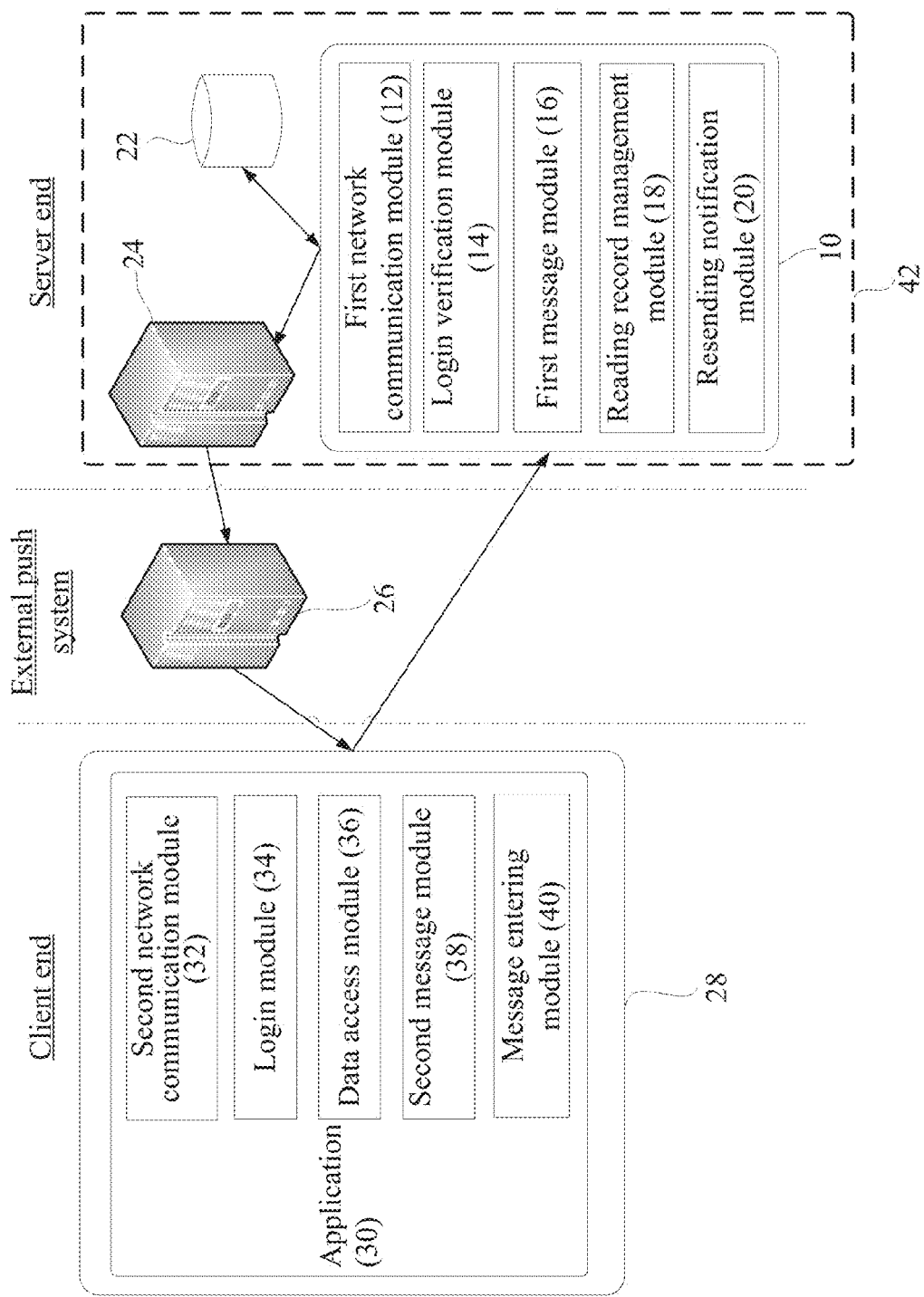
FIG. 1 is a schematic view of the system architecture according to an embodiment of the present invention.

Referring to FIG. 1, there is shown a schematic view of the system architecture according to a preferred embodiment of the present invention. The system of the present invention comprises a database 22, a server 10, and a push gateway 24 at a server end (i.e., a cloud 42), and a mobile communication device 28 at a client end. The server end sends push notification to the client end through an external push system; hence, the external push system is illustrative rather than restrictive of the system of the present invention. The database 22 stores therein at least one message, a plurality of member information sets, and at least one read/unread information set. Each message comprises a message content and a recipient list (i.e., a receiver of the message). The member information sets each comprises the account and the password. The read/unread information set relates to a member list associated with the read or unread message content, that is, "all the read members who have read message content" or "all the unread members who have not yet read message content". The read/unread information set records a read/unread state of the message associated with the member information sets. For example, after a specific message has ever been read by 10 members, the read/unread information set keeps a record of the 10 read members or keeps a record of unread members among all the members who have received the message. The messages in the database 22 carry the read/unread information set, respectively. The read information set are updated as soon as a read state of the mobile communication device 28 of the member is uploaded.

In various embodiments of the present invention, persons skilled in the art understand that the server 10 of the cloud 42 creates a resending list of message content in accordance with a read state or an unread state associated with the member information sets and indicated by the read/unread information set. For example, the server identifies, in accordance with a read state associated with the member information sets, unread members among all the members who have received the message so as to create the resending list. Alternatively, the server identifies, in accordance with an unread state associated with the member information sets, unread members among all the members who have received the message so as to create the resending list.

The server 10 comprises one or more processors and implements through the coordinated operation of hardware and software the modules as follows: a first network communication module 12, a login verification module 14, a first message module 16, a reading record management module 18, and a resending notification module 20. The first network communication module 12 establishes a network connection with a second network communication module 32 of the mobile communication device 28 at the client end. In various embodiments of the present invention, the network connection complies with TCP protocol (including Socket and WebSocket connection), HTTP protocol, or HTTPS protocol. The login verification module 14 verifies whether the mobile communication device 28 has any network connection with the server 10, receives the account and the password uploaded from a specific member through the mobile communication device 28, and verifies the account and the password by comparing them with the account and the password attributed to the member information sets and stored in the database 22. The first message module 16 receives a message uploaded by the mobile communication device 28, writes the message to the database 22, and creates a recipient push list in accordance with the recipient list of the message. The recipient push list comprises at least one push ID corresponding to the mobile communication device 28 associated with the member information sets. The push ID corresponds to a receiving device (i.e., the mobile communication device 28) of a member. To configure receivers (i.e., the recipient list) of a message, the user selects, by checking off, members from an organization directory (e.g., organization address book, organization contact list). The first message module 16 must perform a data mapping process in order to convert the receivers (i.e., the "members selected from the organization directory") into a recipient push list (i.e., "push IDs" of the selected members). The reading record management module 18 records the "read state of a specific message" uploaded from the mobile communication device 28 by a user (i.e., a member) in the read information set of the database 22. If the user uploads the "read list query instruction of a specific message", the reading record management module 18 creates a read list in accordance with the read information set of the message. When the user uploads an "unread list query instruction regarding a specific message", the reading record management module 18 compares member information sets (initial receivers of the message, i.e., the "recipient list" or "recipient push list") in accordance with the read information set of the message so as to create an unread list. For example, in the situation where there are initially 30 member receivers of a specific message, and the read information set records 10 members, such that the unread list is created by comparing the read information set and the initial receivers (i.e., the "recipient list" or "recipient push list") by the reading record management module 18. The resending notification module 20 creates a resending list in accordance with a "member selection instruction of an unread list regarding a specific message" uploaded by the user. Since the data intended by the "member selection instruction of an unread list" relates to "members", the resending notification module 20 has to perform a data mapping process in order to create a resending list (i.e., the members' "push ID") of the resending receivers. In addition, the resending notification module 20 creates a resending list in accordance with the read information set, wherein the resending list comprises the push ID of the member information sets associated with the unread message.

In an embodiment of the present invention, the aforesaid modules of the server 10 are regarded as resources for use in the coordinated operation of hardware and software, and the technical features of each module are expressed by a plurality of program instructions or part of an application, but the technical effect of each module must be achieved through the execution of the program instructions or the application (i.e., resources for use in the coordinated operation of hardware and software) by one or more processors. Related problems are solved by the present invention through the resources for use in the coordinated operation of hardware and software.

Furthermore, in an embodiment of the present invention, the resending list created by the resending notification module 20 comprises members' phone numbers. The server 10 hands over the resending list to a short message server (i.e., a server equipped with a phone number and adapted to process transmission of short messages, not shown) of the cloud 42 to send a message in the form of a short message (SMS. Aka text message) or a multimedia short message (MMS) to the phone number of the mobile communication device 28 corresponding to the resending list. The purpose of this embodiment is to preclude the situation where the mobile communication device 28 cannot receive any push notification for lack of a network environment.

The present invention does not put any limit on the number of apparatuses on which the server 10 and the database 22 are deployed. In various embodiments of the present invention, the server 10 and the database 22 are deployed on the same apparatus. Alternatively, the server 10 and the database 22 are deployed on cluster-structured apparatuses, respectively, or on differently located cluster-structured apparatuses, respectively.

The push gateway 24 creates a push notification in accordance with the message and sends the push notification to the mobile communication device 28 corresponding to a resending list or a recipient push list through an external push host 26 (such as MPNS, GCM, and APNS). In an embodiment of the present invention, the push notification related to the message comprises partial or full contents of the message and the push ID on the recipient push list. The push notification comprises a unique push notification serial number (or at least is not duplicated within a searchable range of recent data). For example, the push ID comprises a member serial number and an international mobile equipment ID (IMEI) of the member mobile device. In the case of more than one mobile communication device 28, the push ID comprises the IMEI of the mobile communication device 28 for the latest use with the login of the database 22. In an embodiment of the present invention, the "partial or full contents of the message" related to the push notification depends on the length of the contents of the message. Take APNS as an example, since it allows a maximum of 256 bytes of the message content (payload), the push notification comprises the full contents of a message when the message has less than 256 bytes of contents, and the push notification comprises the partial contents (i.e., the first 256 bytes of contents) of a message when the message has more than 256 bytes of contents. In another embodiment of the present invention, the message comprises a message subject whose push notification is sent according to the message subject.

In various embodiments of the present invention, the mobile communication device 28 is a smartphone or tablet running on iOS, Android or Windows Phone. The mobile communication device 28 comprises one or more processors. The one or more processors execute a plurality of program instructions or an application (App) 30. The resources for use in executing the application 30 by the one or more processors comprise the second network communication module 32, a login module 34, a data access module 36, a second message module 38, and a message entering module 40. The second network communication module 32 establishes a network connection with the first network communication module 12 of the server 10; in various embodiments of the present invention, the network connection complies with TCP protocol, HTTP protocol or HTTPS protocol. The login module 34 receives the account and the password entered by the user (i.e., a member) through the entering interface of the mobile communication device 28 and uploads them to the server 10 for verification. In another embodiment of the present invention, the account and the password are buffered in a memory of the mobile communication device 28 such that, within a specific period of (say, a day or a week), the user can effectuate every instance of login automatically, without entering the account and the password manually. After the data access module 36 receives the push notification, the second network communication module 32 is triggered to establish a network connection (TCP protocol, HTTP protocol or HTTPS protocol) with the first network communication module 12 of the server 10, and full contents of the message corresponding to the push notification serial number are downloaded from the server 10. In an embodiment of the present invention, the network connection established between the second network communication module 32 and the first network communication module 12 complies with TCP protocol or WebSocket protocol (which is a type of TCP protocol operating in the form of HTTP based on a handshake sent from the client end), wherein the data access module 36 downloads a message directly. In another embodiment of the present invention, the network connection established between the second network communication module 32 and the first network communication module 12 complies with HTTP protocol or HTTPS protocol, wherein the data access module 36 downloads a message by polling. The second message module 38 displays the message on a screen of the mobile communication device 28. Receiving a "reading instruction of a message" and uploading the "read state" indicate an event as follows: when the user reads a specific message (creating a reading instruction), the second message module 38 uploads the "read state" (i.e., the information set pertaining to the user's reading the message) to the server 10. Receiving a "read list query instruction of a message" to download and display a read list indicates an event as follows: after the user has issued a "read list query instruction" (for example, by clicking on a "read" button) regarding a specific message, the second message module 38 uploads the "read list query instruction", then downloads a read list of the message, and eventually displays the read list on a screen. Receiving an "unread list query instruction of a message" to download and display an unread list indicates events as follows: after the user has issued an "unread list query instruction" (for example, by clicking on an "unread" button) regarding a specific message, the second message module 38 uploads the "unread list query instruction", then downloads an unread list of the message, and eventually displays the unread list on a screen. Receiving a "member selection instruction of the unread list" indicates an event as follows: the user checks off a CheckBox in the unread list to select members and uploads the result of member selection to the server 10.

The one or more processors execute a plurality of program instructions, namely a first program instruction, a second program instruction, a third program instruction, and a fourth program instruction. The first program instruction instructs the mobile communication device 28 to establish a network connection with the server 10 to undergo login verification. The second program instruction instructs the mobile communication device 28 to receive a push notification and then download from the server 10 a message content of the message corresponding to a push notification serial number. The third program instruction instructs the mobile communication device 28 to display the message content on a screen and download and display an unread list in response to an unread list query instruction, upload the read state in response to a reading instruction of a message, or download and display the read list in response to a read list query instruction of a message. The fourth program instruction instructs the mobile communication device 28 to receive a new message which has just been entered and upload the new message to the server 10, wherein the new message comprises a new message content and a new recipient list.

In various embodiments of the present invention, the first through fourth program instructions executed by the one or more processors are illustrative of a plurality of program instructions of the present invention rather than restrictive of their respective technical features or respective steps of the process flow of the method of the present invention. Persons skilled in the art understand that the respective technical features or respective steps of the process flow of the method with respect to the first through fifth program instructions can be combined in a manner to be expressed by different combinations of program instructions.

As mentioned before, messages of the present invention are for use with a bulletin board, a chat room, or timeline news. When the messages are for use with a bulletin board or timeline news, all message-receiving members (i.e., all the members listed on the recipient push list) have the authority to check the read list and unread list displayed on the second message module 38. When the messages are for use with a multi-person chat room, only message senders and administrators have the authority to check the read list and unread list displayed on the second message module 38.

According to the present invention, the purpose for the second message module 38 to "receive a member selection instruction of an unread list" is to "resend a push notification once to the unread members of a specific message", because, in some circumstances, for example, a noisy environment or a short period of time in which mobile phones are left unattended, the members may not notice a push notification sent in the first instance. If a message is important or urgent, the message sender or administrator can inquire of an unread list and send a push notification in a second instance (i.e., resend a push notification) regarding all or part of the members on the unread list. The push notification sent in the second instance and the push notification sent in the first instance are distinguished from each other by a flag or a specific information set adding by the server 10. Furthermore, in an embodiment of the present invention, the application 30 stores therein a first prompt and a second prompt. The first prompt serves as a reminder of pushing the message in a first instance, whereas the second prompt serves as a reminder of resending the pushed message and forces the mobile communication device 28 to make at least a portion of message content remains on top. The two prompts include a push notification ringtone to allow a first ringtone to function as a reminding sound for use with the first-instance push and allow a second ringtone to function as a reminding sound for use in the second-instance push (resending) process. The second ringtone is louder than the first ringtone. In another embodiment, the second ringtone lasts longer than the first ringtone. In yet another embodiment, the first ringtone and the second ringtone differ from each other to serve a distinct purpose. In yet another embodiment, during the second-instance push (resending) process, the second ringtone is accompanied by "compulsory vibration" to enhance the reminding effect. The "compulsory vibration" is defined as follows: even if a vibration function of the application 30 executed by the mobile communication device 28 is disabled by the user, the second-instance push process further entails generating a compulsory vibration instruction for overwriting the configuration of the disabling of the vibration function during the second-instance push process and thus allowing the mobile communication device to have a vibration-based reminding effect during the second-instance push process.

Figure 8:
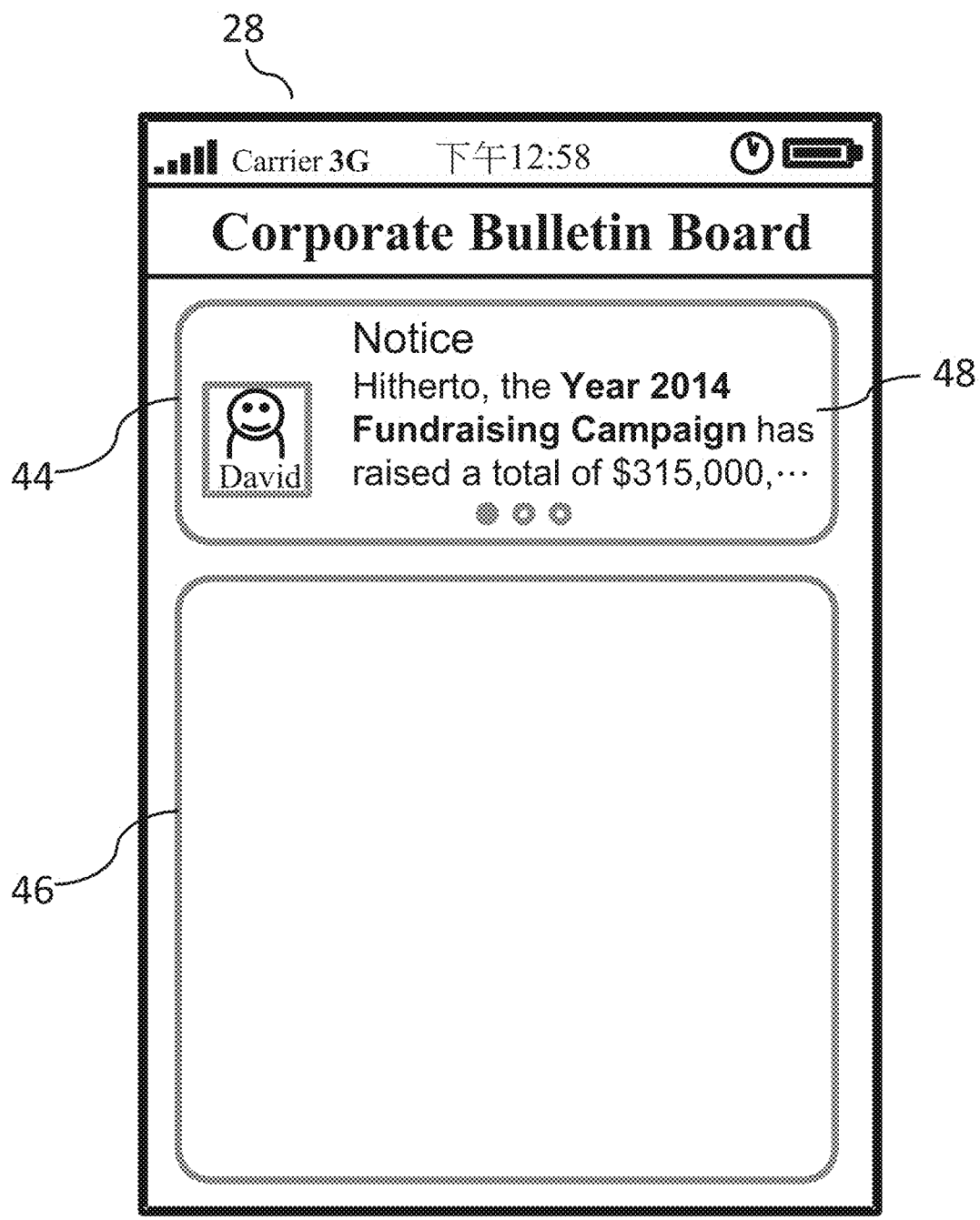
FIG. 8 is a schematic view which shows that a view displayed on the screen of the mobile communication device is configured to show a priority display block for displaying multiple resending messages according to an embodiment of the present invention.

In an embodiment of the present invention, the second prompt forces the mobile communication device 28 to make at least a portion of message content 48 remain on top in the event of resending the pushed message, as shown in FIG. 8. A view displayed on the screen of the mobile communication device 28 is configured to show a priority display block 44 and a non-priority display block 46. The non-priority display block 46 displays multiple message contents or a portion of message content related to the first prompt. The user can read the message content displayed in the non-priority display block 46 by scrolling up and down the message content to select the message content. Since one of the message contents displayed in the non-priority display block 46 has not yet been read, the priority display block 44 shown in the view displayed on the screen is configured to display the unread message content or an unread portion of message content 48 as soon as the mobile communication device 28 receives a resend push notification of the unread message content. The aforesaid technical features are illustrative of one of the embodiments for effectuating "remain on top" with the mobile communication device 28 according to the present invention. In various embodiments of the present invention, feasible ways of arranging the priority display block 44 and the non-priority display block 46 in order to effectuate "remain on top" are as follows: the priority display block 44 and the non-priority display block 46 are aligned vertically but do not overlap each other; or the priority display block 44 and the non-priority display block 46 overlap each other, wherein the priority display block 44 is not hidden by the non-priority display block 46. When displayed in the priority display block 44, multiple message contents or a portion of message content related to the second prompt can be read by the user if the user moves the multiple message contents or a portion of message content laterally and selects the multiple message contents or a portion of message content.

Various embodiments distinguished by the first ringtone and the second ringtone according to the present invention can be implemented with Android-powered mobile communication devices. At present, only one ringtone is applicable to iOS-powered mobile communication devices, because related APIs have not yet been available to software developers nowadays. Once the related APIs become available to iOS-powered mobile communication devices, embodiments distinguished by the first ringtone and the second ringtone can be implemented with iOS.

In another embodiment of the present invention, the resources for use in executing the application 30 by the mobile communication device 28 further comprise the message entering module 40. The message entering module 40 enters a new message in accordance with a received member instruction, including entering content (may be inclusive of a message subject) and a receiver (i.e., the recipient list). The "recipient list" involves selecting, by checking off, specific members from a directory (such as an organization directory or personal directory.)

Figure 2:
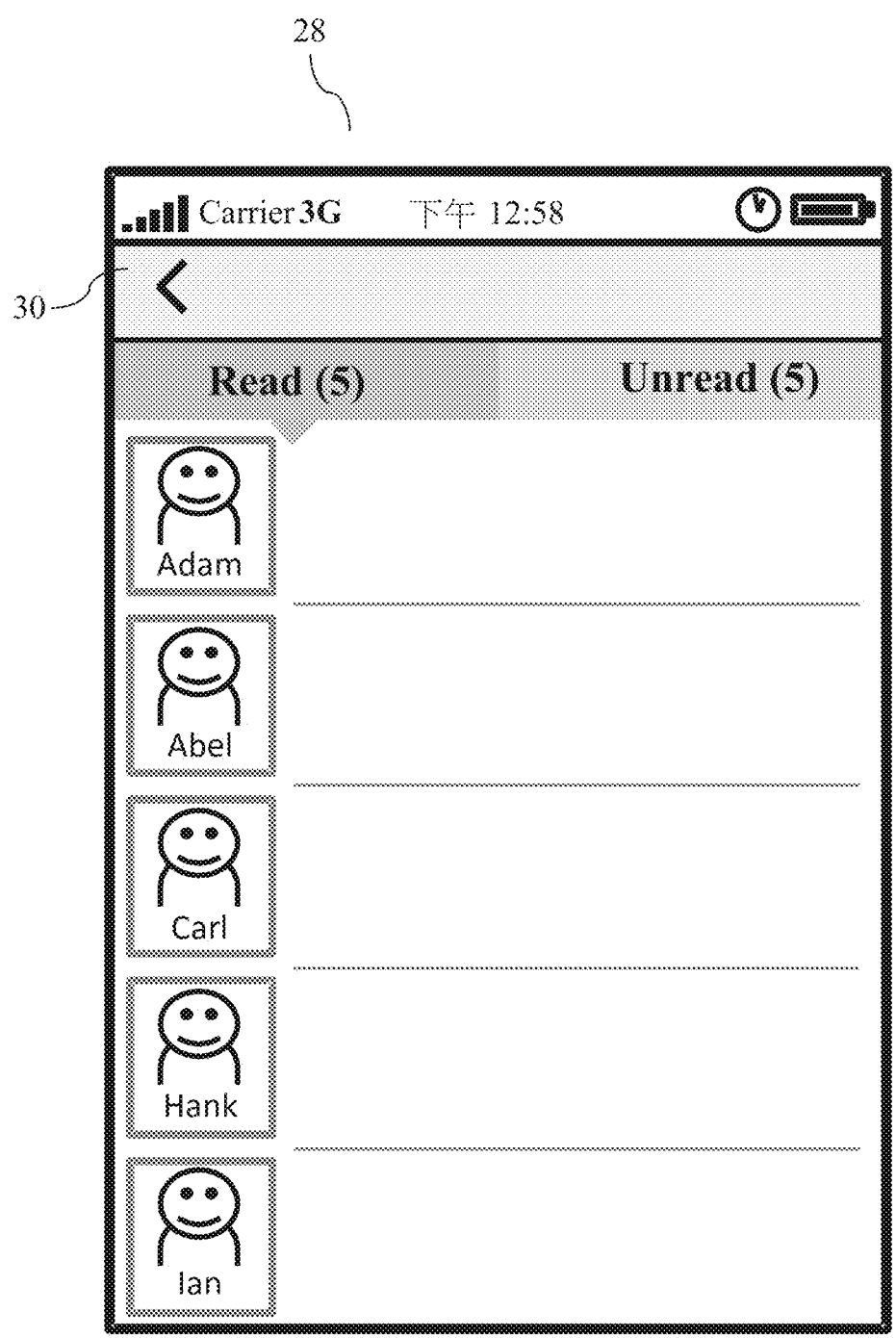
FIG. 2 is a schematic view of a mobile communication device displaying a read list according to an embodiment of the present invention.

Referring to FIG. 2, there is shown a schematic view of the mobile communication device 28 displaying a read list according to an embodiment of the present invention. As shown in the diagram, in an embodiment of the present invention, after the mobile communication device 28 has executed the application 30, the user inquires of a "read list" about a specific message (such as a bulletin board message, a chat message or an article.) As shown in the diagram, members who read the message include Adam, Abel, Carl, Hank, and Ian, wherein the numbers enclosed in parentheses beside the read tab and the unread tab indicate the number of the related members, respectively. As shown in the diagram, there are 5 read members and 5 unread members. In this embodiment, the read list and the unread list are displayed in the form of tabs, respectively. In another embodiment of the present invention, the user clicks on buttons (not shown) or pages (not shown) to display the read list and the unread list, respectively.

Figure 3:
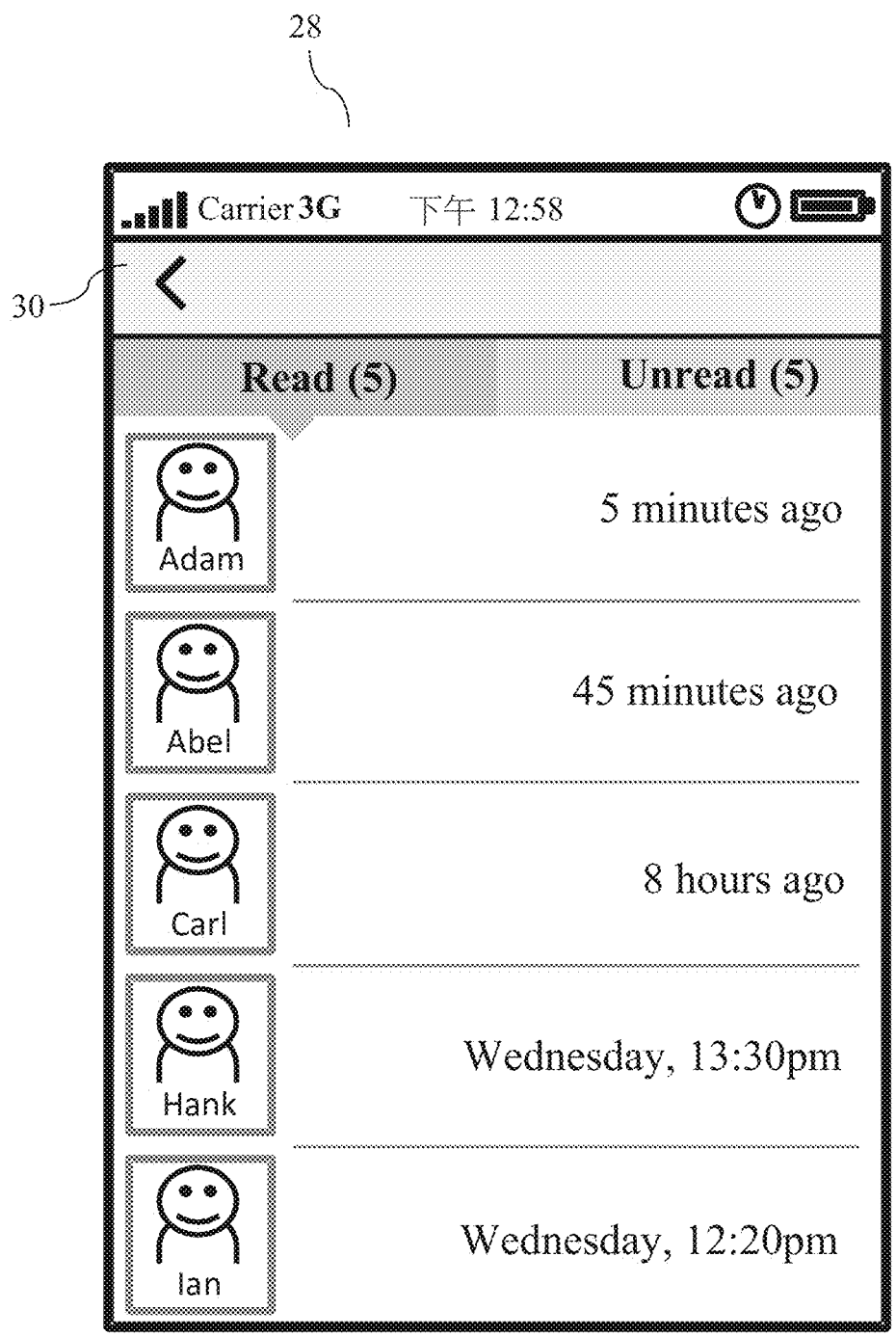
FIG. 3 is a schematic view of the mobile communication device displaying the read list according to another embodiment of the present invention.

Referring to FIG. 3, there is shown a schematic view of the mobile communication device 28 displaying the read list according to another embodiment of the present invention. Unlike the preceding embodiment (illustrated with FIG. 2), this embodiment features a "reading timestamp". The reading timestamp, which is defined as the time at which a member reads a message, is exemplified by "Adam read 5 minutes ago", "Carl read 8 hours ago", and "Ian read on Wednesday, 12:20 pm". In the situation where the member reads the message more than a week ago, the "reading timestamp" is expressed in the format mm/dd.

Figure 4:
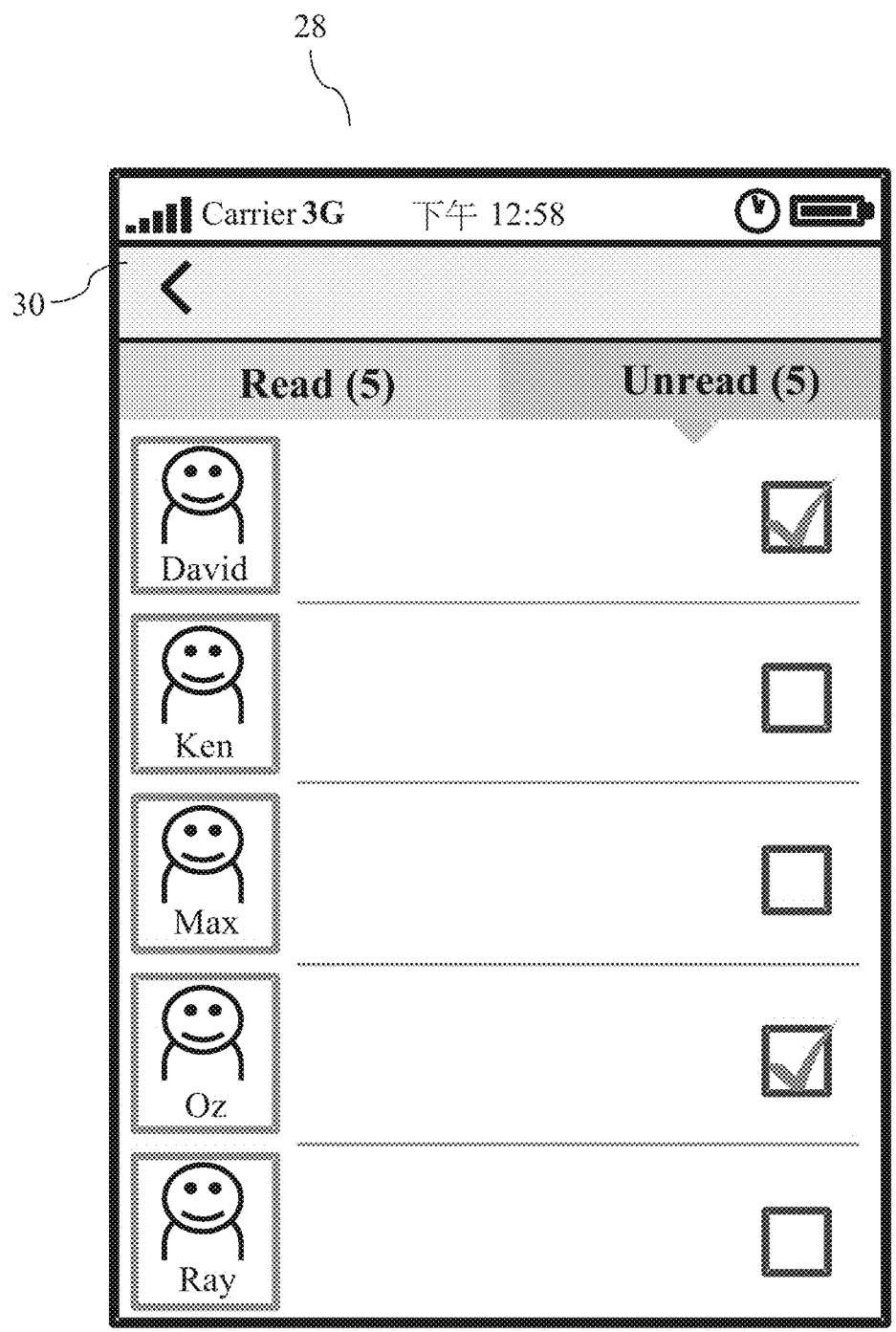
FIG. 4 is a schematic view of the mobile communication device displaying an unread list according to an embodiment of the present invention.

Referring to FIG. 4, there is shown a schematic view of the mobile communication device 28 displaying an unread list according to an embodiment of the present invention. As shown in the diagram, in an embodiment of the present invention, after the mobile communication device 28 has executed the application 30, the user inquires of an "unread list" about a specific message (such as a bulletin board message, a chat message or an article). As shown in the diagram, members who have not yet read the message include "David", "Ken", "Max", "Oz" and "Ray". According to the present invention, a CheckBox is displayed beside the names of the members on the unread list such that the user can check off the CheckBox (i.e., to receive the "member selection instruction of an unread list") or click on the button "checking off all" (not shown) and then click on the button "resend" (not shown) to upload the "member selection instruction of an unread list" (i.e., "selected members") to the server 10 for resending a push notification.

Figure 5:
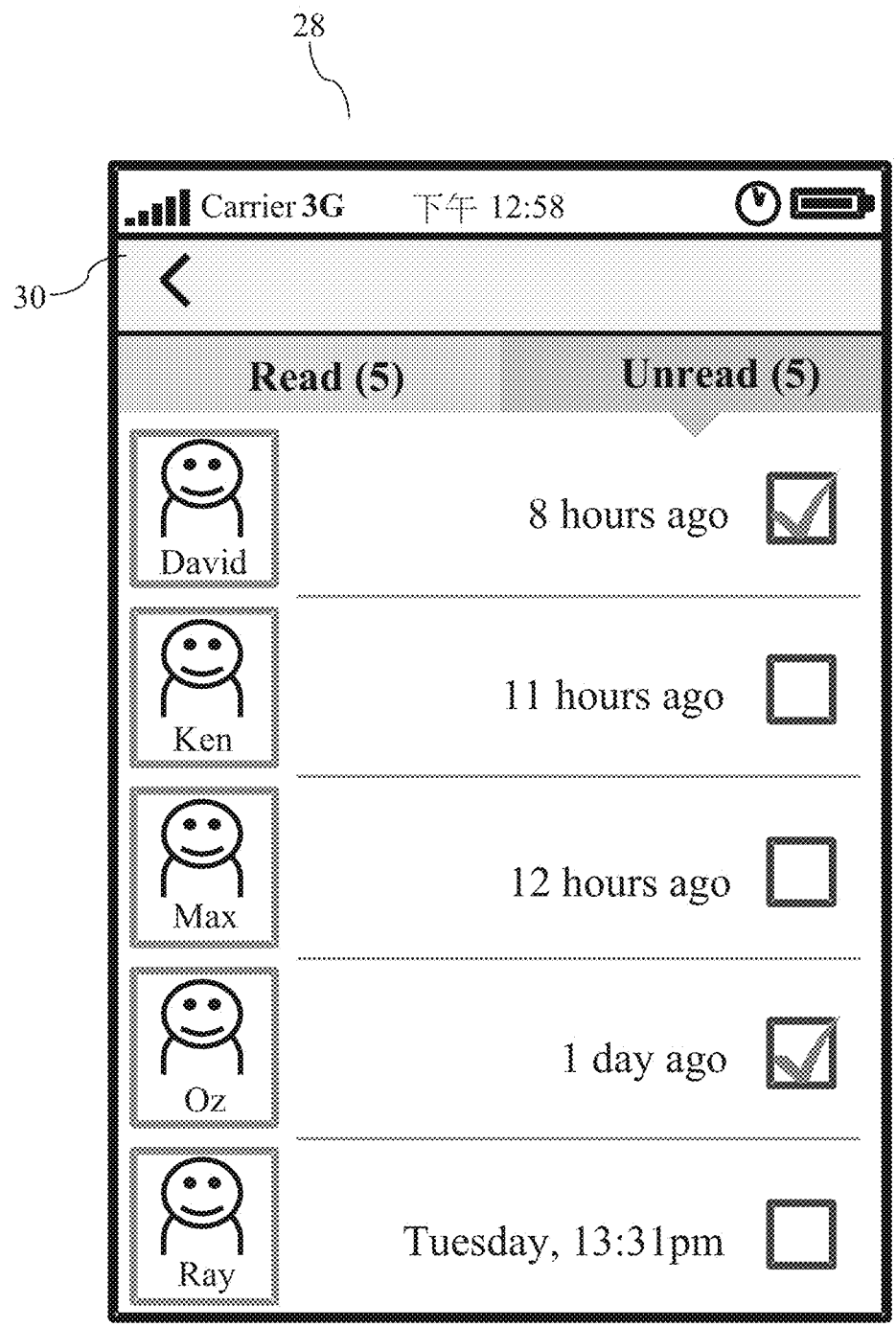
FIG. 5 is a schematic view of the mobile communication device displaying the unread list according to another embodiment of the present invention.

Referring to FIG. 5, there is shown a schematic view of the mobile communication device 28 displaying the unread list according to another embodiment of the present invention. Unlike the preceding embodiment (FIG. 4), this embodiment features a "timestamp". In an embodiment of the present invention, the timestamp in the unread list indicates the "date and time of the latest login to the system" by an unread member. In another embodiment of the present invention, the timestamp in the unread list indicates the "date and time of the latest entry into the chat room" by an unread member.

Furthermore, in an embodiment of the present invention, upon completion of resending a push notification, the date and time of resending the push notification is displayed in the unread list (by the timestamp shown in FIG. 5) such that a message sender or administrator can inquire whether "the push notification has been sent again" or inquire about "the last time the push notification was sent again". In yet another embodiment of the present invention, after the resending of the push notification, the unread list displays the number of instances of resending the push notification, such as "once", "twice", and so forth (not shown), to allow the message sender or administrator to inquire about the "number of instances of resending the push notification".

Figure 6:
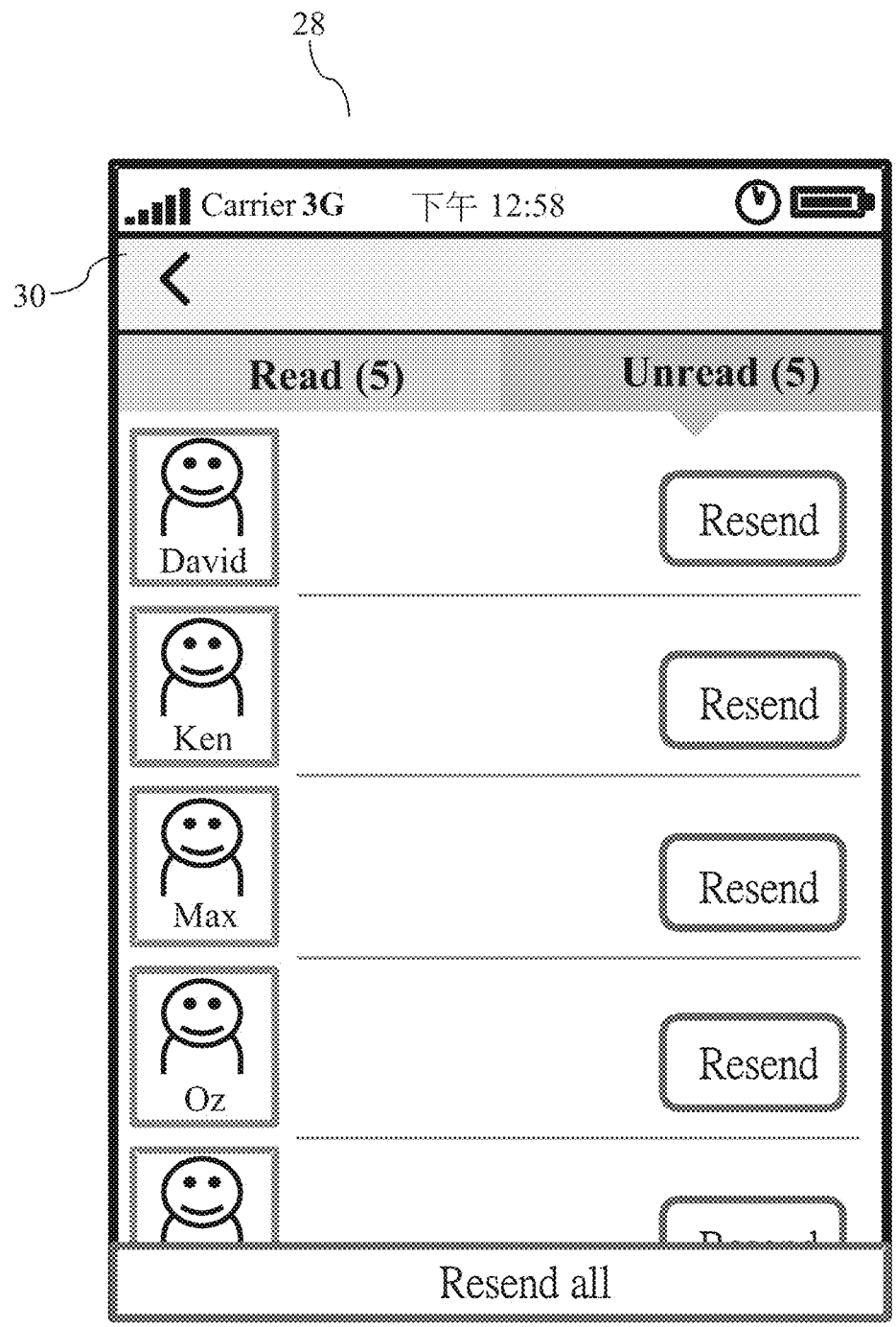
FIG. 6 is a schematic view of the mobile communication device displaying the unread list according to yet another embodiment of the present invention.

Referring to FIG. 6, there is shown a schematic view of the mobile communication device 28 displaying the unread list according to yet another embodiment of the present invention. Unlike the embodiment illustrated with FIG. 4, this embodiment is characterized in that the button "resend" is displayed directly beside the members' names on the unread list so that the user can resend a push notification to each of the members without selecting the members one by one and then pressing the button "resend". Alternatively, the user presses the button "resend all" displayed at the bottom of the screen to resend a push notification to all the members on the unread list.

Figure 7:
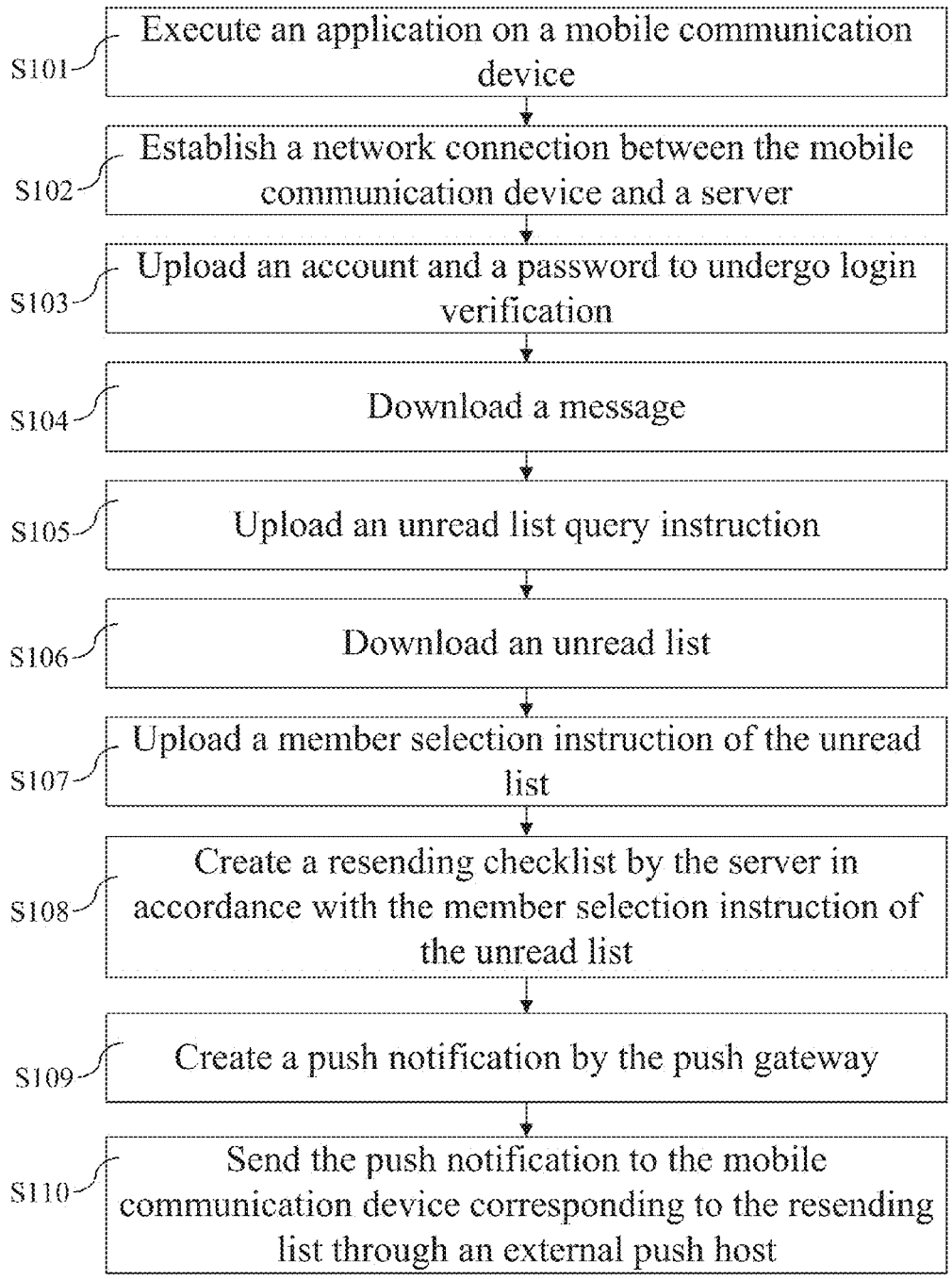
FIG. 7 is a flowchart of operation according to an embodiment of the present invention.

Referring to FIG. 7, there is shown a flowchart of operation according to an embodiment of the present invention. As shown in the diagram, a user with authority, such as the sender of the original message or the administrator, logs in to the system to read messages (such as bulletin board messages, chat messages, and articles) on the unread list, then select members on the unread list, and eventually resend a push notification. Referring to FIG. 1 and FIG. 4, the process flow of the method of the present invention comprises the steps described below.

Step S101: execute the application 30 on the mobile communication device 28. The mobile communication device 28 is exemplified by Apple's iPhone 6 or iPad Air 2.

Step S102: establish a network connection between the mobile communication device 28 and the server 10. Upon execution of the application 30, the second network communication module 32 of the application 30 establishes a network connection with the first network communication module 12 of the server 10 of the cloud 42, wherein the network connection complies with TCP protocol (including Socket and WebSocket connection), HTTP protocol, or HTTPS (i.e., HTTP over SSL) protocol.

Step S103: upload the account and the password to undergo login verification. A user (member) with authority enters the account and the password by the application 30. Then, the account and the password entered by the user are uploaded to the server 10 by the login module 34 of the mobile communication device 28 to undergo login verification performed by the login verification module 14. In another embodiment of the present invention, the account and the password previously entered are buffered in the login module 34 within an effective time period such that execution of the application 30 automatically causes the account and the password to be uploaded to the server 10 and then subjected to login verification performed by the login verification module 14.

Step S104: download a message by the mobile communication device 28. The data access module 36 downloads the message, and then the second message module 38 displays the message on the screen.

Step S105: upload an unread list query instruction. The second message module 38 receives an "unread list query instruction of a message" issued by the user (for example, by clicking on the "unread" button or the "unread" tab shown in FIG. 2) and then uploads it to the server 10.

Step S106: download an unread list. After the unread list query instruction has been uploaded, the reading record management module 18 compares the member information sets (initial receivers of the message, i.e., the "recipient list" or "recipient push list") in accordance with the read information set related to this message and stored in the database 22, so as to create an unread list. After being downloaded, the unread list is displayed on the screen by the second message module 38, as shown in FIG. 4 (without selecting the CheckBox shown in the diagram, because its initial state must be "unselected".)

Step S107: upload a member selection instruction of the unread list. After the screen has displayed the unread list, the user issues a "member selection instruction of an unread list" by selecting it, so as to resend a push notification to the members of the unread messages once. Afterward, the user presses the button "resend" (not shown) such that the second message module 38 uploads the "member selection instruction of an unread list" (i.e., the "selected members") to the server 10.

Step S108: create a resending list by the server 10 in accordance with the member selection instruction of an unread list. After the "member selection instruction of an unread list" has been uploaded, the resending notification module 20 creates a resending list in accordance with the "member selection instruction of an unread list". Since the data intended by the "member selection instruction of an unread list" relates to "members", the resending notification module 20 has to perform a data mapping process in order to create a resending list (i.e., the members' "push ID") of the resending receivers.

Step S109: create a push notification by the push gateway 24. The push gateway 24 creates the push notification in accordance with the message.

Step S110: send the push notification to the mobile communication device 28 corresponding to the resending list through the external push host 26.

In various embodiments of the present invention, program instructions executed by a computer can implement every block in the flowchart, a combination of the blocks in the flowchart, and the steps in every embodiment. The program instructions are provided to a processor so as to be executed by the processor to thereby produce resources required for a machine or coordinated operation of hardware and software; hence, the instructions are executed on the processor to thereby produce elements required for carrying out actions specified by the blocks in the flowchart or technical effects. Different combinations of program instructions also allow simultaneous execution of at least some operating steps specified in the blocks in the flowchart, whereas the technical solutions indicated by the first through fourth program instructions of an application may vary from embodiment to embodiment. Furthermore, it is also practicable that some of the steps are executed on one or more processors, for example, in the case of a servo computer system of multiple processors or in the case of coordinated operation of a microprocessor in a mobile communication device and a peripheral interface processor. Moreover, in the flowchart, at least one block or a combination of blocks may be performed along with the other block or the other combination of blocks simultaneously or performed in a sequence different from its specified counterpart, without departing from the spirit and scope of the present invention.

Therefore, the blocks in the flowchart of the present invention support a combination of elements required for performing specified actions or technical solutions, a combination of steps required for performing specified actions or technical solutions, and program instruction elements required for performing specified actions or technical solutions. What is also understandable is that the specified actions or technical solutions are effectuated by a combination of blocks in the flowchart as well as each block in the flowchart of the present invention through the coordinated operation of a special-purpose hardware-style system or special-purpose hardware, and program instructions.

In an embodiment of the present invention, the organization directory contains organization job titles and names of members. When a read list and an unread list are displayed on the screen by the second message module 38 or the third program instruction executed by at least one processor, the organization job titles and the names are displayed beside the position of the members on the lists, respectively, to allow the user to identify the members on the lists quickly and accurately without switching to the organization directory to make an inquiry thereof.

In conclusion, the present invention provides a cloud system and method of an enterprise mobile message and a mobile communication device for use in accessing the cloud, so as to cope with "the difficulty in following up the reading state of a sent message" and "the failure to resend a push notification to an unread member" and thus enhance the efficiency of delivering important messages. Furthermore, according to the present invention, a ringtone or vibration is amplified during the process of resending a push notification; hence, hardware resources available to the mobile communication devices are accessed in a manner different from what a conventional prompt can achieve as soon as the push notification is sent again, so as to draw attention from message readers, allow the message readers to spot a high-priority message from numerous messages, and prevent the message readers from missing any important messages.

The technical solution of the present invention is disclosed above by preferred embodiments. However, the preferred embodiments are not restrictive of the present invention. Slight changes and modifications can be made by persons skilled in the art to the aforesaid embodiments without departing from the spirit of the present invention and shall still fall within the scope of the present invention. Accordingly, the legal protection for the present invention should be defined by the appended claims.

What is claimed is:

1. A system of an enterprise mobile message, comprising:
   a database for storing at least one message, a plurality of member information sets, and at least one read/unread information set, the message comprising a message content and a recipient list, and the read/unread information set recording a read/unread state of the message associated with the member information sets;
   a server comprising at least one processor for accessing the database, comprising:
      a first network communication module implemented by the at least one processor for establishing a network connection with a mobile communication device associated with one of the member information sets;
      a login verification module implemented by the at least one processor for verifying whether the mobile communication device is connected to the server through a network;
      a first message module implemented by the at least one processor for creating a recipient push list in accordance with the recipient list of the message, wherein the recipient push list comprises a push ID associated with the mobile communication device; and
      a resending notification module implemented by the at least one processor for creating a resending list in accordance with the read/unread information set, wherein the resending list comprises the push ID of member information sets associated with the unread message; and
      a push gateway for creating a push notification in accordance with the message and sending the push notification to the mobile communication device corresponding to one of the resending list and the recipient push list through an external push host,
   wherein a cloud comprises the database, the server, and the push gateway.

2. The system of claim 1, wherein the server comprises a reading record management module for creating one of a read list and an unread list in accordance with the member information sets associated with the read/unread information set, and the resending notification module creates the resending list in accordance with of a member selection instruction of the unread list.

3. The system of claim 1, wherein the mobile communication device comprises at least one processor for executing a plurality of program instructions, the program instructions comprising:
  a first program instruction for instructing the mobile communication device to establish a network connection with the server and thereby undergo login verification;
  a second program instruction for instructing the mobile communication device to download the message content corresponding to a push notification serial number from the server after receiving the push notification;
  a third program instruction for instructing the mobile communication device to display the message content on a screen and download and display the unread list in response to an unread list query instruction; and
  a fourth program instruction for instructing the mobile communication device to receive the message entered and upload the message to the server, wherein the message comprises the message content and the recipient list.

4. The system of claim 3, wherein the third program instruction instructs the mobile communication device to respond to a reading instruction of the message and upload the read state.

5. The system of claim 3, wherein the third program instruction instructs the mobile communication device to respond to a read list query instruction of the message so as to download and display the read list.

6. The system of claim 3, wherein the third program instruction instructs the mobile communication device to mark one of an organization job title associated with the member information sets, a name associated with the member information sets, and a combination thereof while displaying the unread list.

7. The system of claim 5, wherein the third program instruction instructs the mobile communication device to mark one of an organization job title associated with the member information sets, a name associated with the member information sets, and a combination thereof while displaying the read list.

8. The system of claim 1, wherein the mobile communication device stores therein a first prompt and a second prompt in advance, with the first prompt serving as a reminder of pushing the message in a first instance, and the second prompt serving as a reminder of resending the pushed message.

9. The system of claim 8, wherein the first prompt and the second prompt are a first ringtone and a second ringtone, respectively, whereas the first ringtone and the second ringtone differ from each other to serve a distinct purpose.

10. The system of claim 9, wherein the second ringtone is louder than the first ringtone.

11. The system of claim 9, wherein the second ringtone lasts longer than the first ringtone.

12. The system of claim 8, wherein the second prompt comprises a compulsory vibration instruction for instructing the mobile communication device to produce a vibration-based reminding effect.

13. The system of claim 3, wherein the third program instruction instructs the mobile communication device to display a timestamp in response to the member information sets while displaying the unread list.

14. The system of claim 13, wherein the timestamp is one of a "date and time of the latest login to the system", a "date and time of the latest entry into a chat room", and a "date and time of a previous instance of resending the push notification".

15. The system of claim 1, further comprising a short message server for sending the message in form of one of a multimedia short message and a short message to the mobile communication device corresponding to the resending list.

16. The system of claim 8, wherein the second prompt forces the mobile communication device to make at least a portion of message content remains on top.

17. A system of an enterprise mobile message, comprising:
  a database for storing at least one message, a plurality of member information sets, and at least one read/unread information set, the message comprising a message content and a recipient list, and the read/unread information set recording a read/unread state of the message associated with the member information sets;
  a server comprising at least one processor for accessing the database, further comprising:
    a first network communication module implemented by the at least one processor for establishing a network connection with a mobile communication device associated with one of the member information sets;
    a first message module implemented by the at least one processor for creating a recipient push list in accordance with the recipient list of the message, wherein the recipient push list comprises a push ID associated with the mobile communication device; and
    a reading record management module implemented by the at least one processor for comparing the member information sets in accordance with the read/unread information set to create one of a read list and an unread list, wherein a resending list is created in accordance with the unread list and comprises the push ID associated with the unread message of the member information sets; and
  a push gateway for creating a push notification in accordance with the message and sending the push notification to the mobile communication device corresponding to one of the resending list and the recipient push list through an external push host,
  wherein a cloud comprises the database, the server, and the push gateway.

18. The system of claim 17, wherein the server comprises a resending notification module for creating the resending list in accordance with a member selection instruction of the unread list.

19. The system of claim 17, wherein the mobile communication device comprises at least one processor for executing a plurality of program instructions, the program instructions comprising:
  a first program instruction for instructing the mobile communication device to download the message content corresponding to a push notification serial number from the server after receiving the push notification; and
  a second program instruction for instructing the mobile communication device to display the message content on a screen and download and display the unread list in response to an unread list query instruction or download and display the read list in response to a read list query instruction.

20. The system of claim 19, wherein the second program instruction instructs the mobile communication device to mark at least one of an organization job title and a name which are associated with the member information sets while displaying one of the read list and the unread list.

21. The system of claim 19, wherein the second program instruction instructs the mobile communication device to display a timestamp corresponding to the member information sets while displaying one of the read list and the unread list.

22. The system of claim 21, wherein the timestamp is one of a "date and time of the latest login to the system", a "date and time of the latest entry into the chat room", and a "date and time of a previous instance of resending the push notification".

23. The system of claim 17, wherein the mobile communication device stores a first prompt and a second prompt in advance, with the first prompt serving as a reminder of pushing the message in a first instance, and the second prompt serving as a reminder of resending the pushed message.

24. The system of claim 23, wherein the first prompt and the second prompt are a first ringtone and a second ringtone, respectively, whereas the first ringtone and the second ringtone differ from each other to serve a distinct purpose.

25. The system of claim 24, wherein the second ringtone is louder than the first ringtone.

26. The system of claim 24, wherein the second ringtone lasts longer than the first ringtone.

27. The system of claim 23, wherein the second prompt comprises a compulsory vibration instruction for instructing the mobile communication device to produce a vibration-based reminding effect.

28. The system of claim 17, further comprising a short message server for sending the message in form of one of a short message and a multimedia short message to the mobile communication device corresponding to the resending list.

29. The system of claim 23, wherein the second prompt forces the mobile communication device to make at least a portion of message content remains on top.

30. A method of an enterprise mobile message, applicable to a cloud comprising a database, a server, and a push gateway, the method comprising the steps of:
storing at least one message content, a plurality of member information sets, and at least one read/unread information set in the database, wherein the read information set records a read/unread state of the message content associated with the member information sets;
establishing a network connection between the server and a mobile communication device associated with one of the member information sets, downloading the message content to the mobile communication device at request of the mobile communication device, receiving the read state associated with the message content, and recording the read state in the read/unread information set;
creating a resending list by the server in accordance with the read/unread information set, the resending list comprising a push ID of the member information sets associated with the unread message content; and
creating a push notification by the push gateway in accordance with the message content and sending the push notification to the mobile communication device corresponding to the push ID of the resending list through a push host.

31. The method of claim 30, further comprising the steps of receiving by the server an unread list query instruction uploaded by the mobile communication device, comparing by the server the member information sets in accordance with the read/unread information set to create an unread list, and creating the resending list by the server in accordance with the unread list.

32. The method of claim 30, further comprising the step of creating a read list in accordance with the member information sets associated with the read/unread information set.

33. The method of claim 30, wherein the mobile communication device comprises at least one processor for executing a plurality of program instructions, the program instructions comprising:
a first program instruction for instructing the mobile communication device to establish a network connection with the server to undergo login verification;
a second program instruction for instructing the mobile communication device to download the message content corresponding to a push notification serial number from the server upon receipt of the push notification; and
a third program instruction for instructing the mobile communication device to display the message content on a screen and download and display an unread list in response to an unread list query instruction, wherein the unread list is created by the server by comparing the member information sets in accordance with the read/unread information set.

34. The method of claim 33, wherein the third program instruction instructs the mobile communication device to download and display a read list in response to a read list query instruction.

35. The method of claim 33, wherein the third program instruction instructs the mobile communication device to mark at least one of an organization job title and a name which are associated with the member information sets while displaying the unread list.

36. The method of claim 34, wherein the third program instruction instructs the mobile communication device to mark at least one of an organization job title and a name which are associated with the member information sets while displaying the read list.

37. The method of claim 30, wherein the mobile communication device stores therein a first prompt and a second prompt in advance, with the first prompt serving as a reminder of pushing the message content in a first instance, and the second prompt serving as a reminder of resending the pushed message content.

38. The method of claim 37, wherein the first prompt and the second prompt are a first ringtone and a second ringtone, respectively, whereas the first ringtone and the second ringtone differ from each other to serve a distinct purpose.

39. The method of claim 37, wherein the second prompt forces the mobile communication device to make at least a portion of message content remains on top.

40. The method of claim 37, wherein the second prompt comprises a compulsory vibration instruction for instructing the mobile communication device to produce a vibration-based reminding effect.

41. The method of claim 30, wherein the cloud comprises a short message server for sending the message content in form of one of a multimedia short message and a short message to the mobile communication device corresponding to the resending list.

42. A method of an enterprise mobile message, for a mobile communication device to access a cloud comprising a database, a server, and a push gateway, wherein the database stores therein at least one message content, a plurality of member information sets, and an unread list, the unread list recording the member information sets of the unread message content, wherein the mobile communication device comprises at least one processor for executing a plurality of program instructions, the program instruction comprising:
- a first program instruction for instructing the mobile communication device to establish a network connection with the server to undergo login verification;
- a second program instruction for instructing the mobile communication device to download the message content and the unread list from the server;
- a third program instruction for instructing the mobile communication device to display the member information sets associated with the unread list in accordance with the unread list; and
- a fourth program instruction for instructing the mobile communication device to receive a member selection instruction associated with the unread list and upload the member selection instruction to the server so as to create a resending list in accordance with the member selection instruction by the server, create a push notification by the push gateway, and send the push notification to the mobile communication device corresponding to the resending list through an external push host.

43. The method of claim 42, wherein the mobile communication device stores therein a first prompt and a second prompt in advance, with the first prompt serving as a reminder of pushing the message content in a first instance, and the second prompt serving as a reminder of resending the pushed message content.

44. The method of claim 42, wherein the first prompt and the second prompt are a first ringtone and a second ringtone, respectively, whereas the first ringtone and the second ringtone differ from each other to serve a distinct purpose.

45. The method of claim 44, wherein the second ringtone is louder than the first ringtone.

46. The method of claim 43, wherein the second prompt forces the mobile communication device to make at least a portion of message content remains on top.

47. The method of claim 43, wherein the second prompt comprises a compulsory vibration instruction for instructing the mobile communication device to produce a vibration-based reminding effect.

48. The method of claim 42, wherein the second program instruction instructs the mobile communication device to download and display a read list in response to a read list query instruction.

49. The method of claim 42, wherein the third program instruction instructs the mobile communication device to mark at least one of a name and an organization job title associated with the member information sets while displaying the unread list.

50. The method of claim 48, wherein the third program instruction instructs the mobile communication device to mark at least one of a name and an organization job title associated with the member information sets while displaying the read list.

51. The method of claim 42, wherein the cloud comprises a short message server, and the mobile communication device receives one of a multimedia short message and a short message comprising the message content and sent from the short message server in accordance with the resending list.

* * * * *